(12) United States Patent
Rubin et al.

(10) Patent No.: US 11,262,587 B2
(45) Date of Patent: Mar. 1, 2022

(54) OPTICAL SYSTEM AND METHOD FOR IMPROVEMENT OF LIGHT FIELD UNIFORMITY

(71) Applicant: Lumus Ltd., Ness Ziona (IL)

(72) Inventors: Yuval Rubin, Ness Ziona (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/044,418

(22) PCT Filed: May 22, 2019

(86) PCT No.: PCT/IB2019/054230
§ 371 (c)(1),
(2) Date: Oct. 1, 2020

(87) PCT Pub. No.: WO2019/224740
PCT Pub. Date: Nov. 28, 2019

(65) Prior Publication Data
US 2021/0033872 A1 Feb. 4, 2021

(30) Foreign Application Priority Data
May 22, 2018 (IL) .......................................... 259518

(51) Int. Cl.
*G02B 27/01* (2006.01)
*G06T 3/40* (2006.01)
*G06T 19/00* (2011.01)

(52) U.S. Cl.
CPC ............ *G02B 27/0172* (2013.01); *G06T 3/40* (2013.01); *G06T 19/006* (2013.01);
(Continued)

(58) Field of Classification Search
CPC ............ G02B 27/0172; G02B 27/0081; G02B 27/0093; G02B 2027/011;
(Continued)

(56) References Cited

U.S. PATENT DOCUMENTS 2,748,659 A 6/1956 Geffcken et al.
2,958,258 A 11/1960 Kelly
(Continued)

FOREIGN PATENT DOCUMENTS

BE 357371 2/1929
CN 1606712 4/2005
(Continued)

OTHER PUBLICATIONS

"Lenses and Simple Optics", http://www.nightlase.com.au/education/optics/index.html (Year: 2004).
(Continued)

*Primary Examiner* — Brent D Castiaux
(74) *Attorney, Agent, or Firm* — Mark M. Friedman

(57) ABSTRACT

A display device (10) for producing images to be viewed by an observer includes an optical system (14) and a control unit (20). The optical system receives input light indicative of an image into a light propagation channel (14A) and produces, at an exit pupil (14B), output light having a field of view (FOV) corresponding to the image to be presented to the observer (18). The light propagation channel has an intensity transfer function map $I_1(x,\varphi)$ of the optical system across a lateral dimension x of the exit pupil and an angular 20 span $\varphi$ of the FOV. The control unit (20) modifies the image data which is to be input in the optical system by applying thereto intensity modulation based on a correction intensity map that at least partially compensates intensity non-uniformity in the intensity transfer function map $I_1(x,\varphi)$ of the optical system, such that the light output at the exit
(Continued)

pupil of the optical system and indicative of the image, has a modulated intensity map which is observed by the viewer with improved intensity uniformity.

17 Claims, 6 Drawing Sheets

(52) U.S. Cl.
CPC .. *G02B 2027/011* (2013.01); *G02B 2027/014* (2013.01); *G02B 2027/0125* (2013.01)

(58) Field of Classification Search
CPC ...... G02B 2027/0125; G02B 2027/014; G02B 2027/0118; G02B 6/00; G06T 3/40; G06T 19/006
See application file for complete search history.

(56) References Cited

U.S. PATENT DOCUMENTS

| | | |
|---|---|---|
| 3,626,394 A | 12/1971 | Nelson |
| 3,658,405 A | 4/1972 | Pluta |
| 3,667,621 A | 6/1972 | Barlow |
| 3,677,621 A | 7/1972 | Smith |
| 3,737,212 A | 6/1973 | Antonson et al. |
| 3,807,849 A | 4/1974 | Lobb |
| 3,873,209 A | 3/1975 | Schinke et al. |
| 3,940,204 A | 2/1976 | Withrington |
| 4,084,883 A | 4/1978 | Eastman et al. |
| 4,233,526 A | 11/1980 | Kurogi et al. |
| 4,240,738 A | 12/1980 | Praamsma |
| 4,309,070 A | 1/1982 | St. Leger Searle |
| 4,331,387 A | 5/1982 | Wentz |
| 4,372,639 A | 2/1983 | Johnson |
| 4,383,740 A | 5/1983 | Bordovsky |
| 4,516,828 A | 5/1985 | Steele |
| 4,613,216 A | 9/1986 | Herbec et al. |
| 4,711,512 A | 12/1987 | Upatnieks |
| 4,755,667 A | 7/1988 | Marsoner et al. |
| 4,775,217 A | 10/1988 | Ellis |
| 4,798,448 A | 1/1989 | Van Raalte |
| 4,799,765 A | 1/1989 | Ferrer |
| 4,805,988 A | 2/1989 | Dones |
| 4,932,743 A | 6/1990 | Isobe et al. |
| 5,033,828 A | 7/1991 | Haruta |
| 5,076,664 A | 12/1991 | Migozzi |
| 5,096,520 A | 3/1992 | Faris |
| 5,231,642 A | 7/1993 | Scifres et al. |
| 5,278,532 A | 1/1994 | Hegg et al. |
| 5,301,067 A | 4/1994 | Bleier et al. |
| 5,353,134 A | 10/1994 | Michel et al. |
| 5,369,415 A | 11/1994 | Richard et al. |
| 5,430,505 A | 7/1995 | Katz |
| 5,453,877 A | 9/1995 | Gerbe et al. |
| 5,481,385 A | 1/1996 | Zimmerman et al. |
| 5,499,138 A | 3/1996 | Iba |
| 5,537,260 A | 7/1996 | Williamson |
| 5,539,578 A | 7/1996 | Togino et al. |
| 5,543,877 A | 8/1996 | Takashi et al. |
| 5,555,329 A | 9/1996 | Kuper et al. |
| 5,594,830 A | 1/1997 | Winston et al. |
| 5,619,601 A | 4/1997 | Akashi et al. |
| 5,650,873 A | 7/1997 | Gal et al. |
| 5,680,209 A | 10/1997 | Meinrad |
| 5,708,449 A | 1/1998 | Heacock et al. |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,808,709 A | 9/1998 | Davis |
| 5,808,800 A | 9/1998 | Handschy |
| 5,896,232 A | 4/1999 | Budd et al. |
| 5,909,325 A | 6/1999 | Kuba et al. |
| 5,966,223 A | 10/1999 | Amitai et al. |
| 5,982,536 A | 11/1999 | Swan |
| 6,007,225 A | 12/1999 | Ramer et al. |
| 6,021,239 A | 2/2000 | Minami et al. |
| 6,034,750 A | 3/2000 | Rai et al. |
| 6,052,500 A | 4/2000 | Takano et al. |
| 6,091,548 A | 7/2000 | Chen |
| 6,144,347 A | 11/2000 | Mizoguchi et al. |
| 6,154,321 A | 11/2000 | Melville et al. |
| 6,204,975 B1 | 3/2001 | Watters et al. |
| 6,222,676 B1 | 4/2001 | Takayoshi et al. |
| 6,222,971 B1 | 4/2001 | Veligdan et al. |
| 6,239,092 B1 | 5/2001 | Papasso et al. |
| 6,256,151 B1 | 7/2001 | Ma et al. |
| 6,266,108 B1 | 7/2001 | Bao |
| 6,307,612 B1 | 10/2001 | Smith |
| 6,310,713 B1 | 10/2001 | Doany et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,400,493 B1 | 6/2002 | Mertz et al. |
| 6,404,550 B1 | 6/2002 | Yajima |
| 6,404,947 B1 | 6/2002 | Matsuda |
| 6,406,149 B2 | 6/2002 | Okuyama |
| 6,421,031 B1 | 7/2002 | Ronzani et al. |
| 6,433,339 B1 | 8/2002 | Maeda et al. |
| 6,480,174 B1 | 11/2002 | Kaufmass et al. |
| 6,490,087 B1 | 12/2002 | Fulkerson et al. |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,606,173 B2 | 8/2003 | Kappel et al. |
| 6,671,100 B1 | 12/2003 | McRuer |
| 6,690,513 B2 | 2/2004 | Hulse et al. |
| 6,704,052 B1 | 3/2004 | Togino et al. |
| 6,704,065 B1 | 3/2004 | Sharp et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,825,987 B2 | 11/2004 | Repetto et al. |
| 6,879,443 B2 | 4/2005 | Spitzer et al. |
| 6,880,931 B2 | 4/2005 | Moliton et al. |
| 6,894,821 B2 | 5/2005 | Kotchick |
| 6,926,429 B2 | 8/2005 | Barlow et al. |
| 6,950,220 B2 | 9/2005 | Abramson et al. |
| 7,016,113 B2 | 3/2006 | Choi et al. |
| 7,025,464 B2 | 4/2006 | Beeson et al. |
| 7,163,291 B2 | 1/2007 | Cado et al. |
| 7,199,934 B2 | 4/2007 | Yamasaki |
| 7,205,960 B2 | 4/2007 | David |
| 7,245,273 B2 | 7/2007 | Eberl et al. |
| 7,285,903 B2 | 10/2007 | Cull et al. |
| 7,307,791 B2 | 12/2007 | Li et al. |
| 7,355,795 B1 | 4/2008 | Yamazaki et al. |
| 7,392,917 B2 | 7/2008 | Alalu et al. |
| 7,418,170 B2 | 8/2008 | Mukawa et al. |
| 7,430,355 B2 | 9/2008 | Heikenfeld et al. |
| 7,448,170 B2 | 11/2008 | Skendzic et al. |
| 7,554,737 B2 | 6/2009 | Knox et al. |
| 7,576,918 B2 | 8/2009 | Goggins |
| 7,667,962 B2 | 2/2010 | Mullen |
| 7,710,655 B2 | 5/2010 | Freeman et al. |
| 7,724,442 B2 | 5/2010 | Amitai |
| 7,751,122 B2 | 7/2010 | Amitai |
| 7,777,960 B2 | 8/2010 | Freeman |
| 7,995,275 B2 | 8/2011 | Maeda et al. |
| 8,035,872 B2 | 10/2011 | Ouchi |
| 8,187,481 B1 | 5/2012 | Hobbs |
| 8,405,573 B2 | 3/2013 | Lapidot et al. |
| 8,467,133 B2 | 6/2013 | Miller |
| 8,611,015 B2 | 12/2013 | Wheeler et al. |
| 8,655,178 B2 | 2/2014 | Capron et al. |
| 8,665,178 B1 | 3/2014 | Wang |
| 8,783,893 B1 | 7/2014 | Seurin et al. |
| 8,786,519 B2 | 7/2014 | Blumenfeld et al. |

(56) References Cited

U.S. PATENT DOCUMENTS

| | | |
|---|---|---|
| 8,854,734 B2 | 10/2014 | Ingram |
| 8,913,865 B1 | 12/2014 | Bennett |
| 8,917,453 B2 | 12/2014 | Bohn |
| 8,988,776 B2 | 3/2015 | Weber et al. |
| 8,998,414 B2 | 4/2015 | Bohn |
| 9,488,840 B2 | 11/2016 | Mansharof et al. |
| 9,513,481 B2 | 12/2016 | Levin et al. |
| 9,541,762 B2 | 1/2017 | Mukawa et al. |
| 9,551,874 B2 | 1/2017 | Amitai |
| 9,551,880 B2 | 1/2017 | Amitai |
| 9,709,809 B2 | 7/2017 | Miyawaki et al. |
| 9,805,633 B2 | 10/2017 | Zheng |
| 9,910,283 B2 | 3/2018 | Amitai |
| 9,977,244 B2 | 5/2018 | Amitai |
| 10,209,517 B2 | 2/2019 | Popovich et al. |
| 10,222,535 B2 | 3/2019 | Remhof et al. |
| 10,302,957 B2 | 5/2019 | Sissom |
| 10,571,699 B1 | 2/2020 | Parsons et al. |
| 2001/0013972 A1 | 8/2001 | Doany et al. |
| 2001/0030860 A1 | 10/2001 | Kimura et al. |
| 2001/0055152 A1 | 12/2001 | Richards |
| 2002/0008708 A1 | 1/2002 | Weiss et al. |
| 2002/0015233 A1 | 2/2002 | Park |
| 2002/0021498 A1 | 2/2002 | Ohtaka |
| 2002/0080615 A1 | 6/2002 | Marshall et al. |
| 2002/0080622 A1 | 6/2002 | Pashley et al. |
| 2002/0085281 A1 | 7/2002 | Dubin et al. |
| 2002/0176173 A1 | 11/2002 | Song |
| 2002/0186179 A1 | 12/2002 | Knowles |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0030912 A1 | 2/2003 | Gleckman et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0032660 A1 | 2/2004 | Amitai |
| 2004/0033528 A1 | 2/2004 | Amitai |
| 2004/0080718 A1 | 4/2004 | Kojima |
| 2004/0085649 A1 | 5/2004 | Repetto et al. |
| 2004/0130797 A1 | 7/2004 | Leigh Travis |
| 2004/0136082 A1 | 7/2004 | Cado et al. |
| 2004/0137189 A1 | 7/2004 | Tellini et al. |
| 2004/0145814 A1 | 7/2004 | Rogers |
| 2004/0218271 A1 | 11/2004 | Hartmaier et al. |
| 2004/0263842 A1 | 12/2004 | Puppels et al. |
| 2004/0264185 A1 | 12/2004 | Grotsch et al. |
| 2005/0018308 A1 | 1/2005 | Cassarly et al. |
| 2005/0023545 A1 | 2/2005 | Camras et al. |
| 2005/0024849 A1 | 2/2005 | Parker et al. |
| 2005/0078388 A1 | 4/2005 | Amitai |
| 2005/0083592 A1 | 4/2005 | Amitai et al. |
| 2005/0084210 A1 | 4/2005 | Cha |
| 2005/0173719 A1 | 8/2005 | Yonekubo et al. |
| 2005/0174658 A1 | 8/2005 | Long et al. |
| 2005/0180687 A1 | 8/2005 | Amitai et al. |
| 2005/0248852 A1 | 11/2005 | Yamasaki |
| 2005/0265044 A1 | 12/2005 | Chen et al. |
| 2006/0052146 A1 | 3/2006 | Ou |
| 2006/0061555 A1 | 3/2006 | Mullen |
| 2006/0091784 A1 | 5/2006 | Conner et al. |
| 2006/0103590 A1 | 5/2006 | Divon |
| 2006/0126182 A1 | 6/2006 | Levola |
| 2006/0228073 A1 | 10/2006 | Mukawa |
| 2006/0268421 A1 | 11/2006 | Shimizu et al. |
| 2007/0035706 A1 | 2/2007 | Margulis |
| 2007/0070859 A1 | 3/2007 | Hirayama |
| 2007/0091445 A1 | 4/2007 | Amitai |
| 2007/0097513 A1 | 5/2007 | Amitai |
| 2007/0153344 A1 | 7/2007 | Lin |
| 2007/0155277 A1 | 7/2007 | Amitai |
| 2007/0159673 A1 | 7/2007 | Freeman et al. |
| 2007/0165192 A1 * | 7/2007 | Prior .................. G02B 17/006 353/78 |
| 2007/0206390 A1 | 9/2007 | Brukilacchio et al. |
| 2007/0284565 A1 | 12/2007 | Leatherdale et al. |
| 2007/0285663 A1 | 12/2007 | Hewitt et al. |
| 2007/0291491 A1 | 12/2007 | Li et al. |
| 2008/0013051 A1 | 1/2008 | Glinski et al. |
| 2008/0025667 A1 | 1/2008 | Amitai |
| 2008/0030974 A1 | 2/2008 | Abu-Ageel |
| 2008/0062686 A1 | 3/2008 | Hoelen et al. |
| 2008/0068852 A1 | 3/2008 | Goihl |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0192239 A1 | 8/2008 | Otosaka |
| 2008/0198471 A1 | 8/2008 | Amitai |
| 2008/0198604 A1 | 8/2008 | Kim et al. |
| 2008/0278812 A1 | 11/2008 | Amitai |
| 2008/0285140 A1 | 11/2008 | Amitai |
| 2009/0009719 A1 | 1/2009 | Ryf |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0165017 A1 | 6/2009 | Syed et al. |
| 2009/0275157 A1 | 11/2009 | Winberg et al. |
| 2010/0002465 A1 | 1/2010 | Tsang et al. |
| 2010/0020291 A1 | 1/2010 | Kasazumi et al. |
| 2010/0027289 A1 | 2/2010 | Aiki et al. |
| 2010/0046234 A1 | 2/2010 | Abu-Ageel |
| 2010/0053148 A1 | 3/2010 | Khazeni et al. |
| 2010/0171680 A1 | 7/2010 | Lapidot et al. |
| 2010/0201953 A1 | 8/2010 | Freeman et al. |
| 2010/0202048 A1 | 8/2010 | Amitai et al. |
| 2010/0202128 A1 | 8/2010 | Saccomanno |
| 2010/0202129 A1 | 8/2010 | Abu-Ageel |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2010/0302276 A1 | 12/2010 | Levola |
| 2011/0007243 A1 | 1/2011 | Tanaka |
| 2011/0010988 A1 | 1/2011 | Lanoha |
| 2011/0019250 A1 | 1/2011 | Aiki et al. |
| 2011/0096566 A1 | 4/2011 | Tsai et al. |
| 2011/0109880 A1 | 5/2011 | Nummela |
| 2011/0149547 A1 | 6/2011 | Bruzzone et al. |
| 2011/0228511 A1 | 9/2011 | Weber |
| 2012/0069547 A1 | 3/2012 | Gielen et al. |
| 2012/0147361 A1 | 6/2012 | Mochizuki et al. |
| 2012/0179369 A1 | 7/2012 | Lapidot et al. |
| 2012/0194781 A1 | 8/2012 | Agurok |
| 2012/0218301 A1 | 8/2012 | Miller et al. |
| 2012/0281389 A1 | 11/2012 | Panagotacos et al. |
| 2012/0287621 A1 | 11/2012 | Lee et al. |
| 2013/0022316 A1 | 1/2013 | Pelletier et al. |
| 2013/0038933 A1 | 2/2013 | Wang |
| 2013/0120986 A1 | 5/2013 | Xi |
| 2013/0135749 A1 | 5/2013 | Akutsu et al. |
| 2013/0201690 A1 | 8/2013 | Vissenberg et al. |
| 2013/0208362 A1 | 8/2013 | Bohn et al. |
| 2013/0208498 A1 | 8/2013 | Ouderkirk |
| 2013/0215361 A1 | 8/2013 | Wang |
| 2013/0229717 A1 | 9/2013 | Amitai |
| 2013/0242392 A1 | 9/2013 | Amirparviz et al. |
| 2013/0257832 A1 | 10/2013 | Hammond |
| 2013/0276960 A1 | 10/2013 | Amitai |
| 2013/0279017 A1 | 10/2013 | Amitai |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0104852 A1 | 4/2014 | Duong et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |

(56) References Cited

U.S. PATENT DOCUMENTS

| | | |
|---|---|---|
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0140654 A1 | 5/2014 | Brown et al. |
| 2014/0177049 A1 | 6/2014 | Beck |
| 2014/0019801 A1 | 7/2014 | Sutton et al. |
| 2014/0192539 A1 | 7/2014 | Yriberri et al. |
| 2014/0226215 A1 | 8/2014 | Komatsu et al. |
| 2014/0226361 A1 | 8/2014 | Vasylyev |
| 2014/0240834 A1 | 8/2014 | Mason |
| 2014/0264420 A1 | 9/2014 | Edwards et al. |
| 2014/0293434 A1 | 10/2014 | Cheng |
| 2014/0334126 A1 | 11/2014 | Speier et al. |
| 2014/0374377 A1 | 12/2014 | Schulz |
| 2015/0009682 A1 | 1/2015 | Clough |
| 2015/0009687 A1 | 1/2015 | Lin |
| 2015/0016777 A1 | 1/2015 | Abovitz et al. |
| 2015/0049486 A1 | 2/2015 | Jung et al. |
| 2015/0081313 A1 | 3/2015 | Boross et al. |
| 2015/0098206 A1 | 4/2015 | Pickard et al. |
| 2015/0103151 A1 | 4/2015 | Carls et al. |
| 2015/0103306 A1 | 4/2015 | Kaji et al. |
| 2015/0138451 A1 | 5/2015 | Amitai |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0185475 A1 | 7/2015 | Saarikko et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0247617 A1 | 9/2015 | Du et al. |
| 2015/0260992 A1 | 9/2015 | Luttmann et al. |
| 2015/0277127 A1 | 10/2015 | Amitai |
| 2015/0289762 A1 | 10/2015 | Popovich et al. |
| 2015/0293360 A1 | 10/2015 | Amitai |
| 2015/0355481 A1 | 12/2015 | Hilkes et al. |
| 2016/0018943 A1 | 1/2016 | Nara et al. |
| 2016/0041387 A1 | 2/2016 | Valera et al. |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0209648 A1 | 7/2016 | Haddick et al. |
| 2016/0209657 A1 | 7/2016 | Popovich et al. |
| 2016/0215956 A1 | 7/2016 | Smith et al. |
| 2016/0234485 A1 | 8/2016 | Robbins et al. |
| 2016/0266387 A1 | 9/2016 | Tekolste et al. |
| 2016/0313567 A1 | 10/2016 | Kurashige |
| 2016/0314564 A1* | 10/2016 | Jones .................. G09G 3/20 |
| 2016/0327906 A1 | 11/2016 | Futterer |
| 2016/0341964 A1 | 11/2016 | Amitai |
| 2016/0349518 A1 | 12/2016 | Amitai et al. |
| 2016/0370534 A1 | 12/2016 | Liu et al. |
| 2017/0003504 A1* | 1/2017 | Vallius .............. G02B 27/0172 |
| 2017/0011555 A1 | 1/2017 | Li et al. |
| 2017/0017095 A1 | 1/2017 | Fricker et al. |
| 2017/0045666 A1 | 2/2017 | Vasylyev |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1* | 5/2017 | Yeoh ................... H04N 13/398 |
| 2017/0176755 A1 | 6/2017 | Cai |
| 2017/0242249 A1 | 8/2017 | Wall |
| 2017/0276947 A1 | 9/2017 | Yokoyama |
| 2017/0299860 A1 | 10/2017 | Wall et al. |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0120559 A1 | 5/2018 | Yeoh et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1 | 9/2020 | Amitai et al. |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0149204 A1 | 5/2021 | Amitai et al. |
| 2021/0157150 A1 | 5/2021 | Amitai |
| 2021/0165231 A1 | 6/2021 | Gelberg et al. |

FOREIGN PATENT DOCUMENTS

| | | |
|---|---|---|
| CN | 1795399 | 6/2006 |
| CN | 101542346 | 9/2009 |
| CN | 101846799 | 9/2010 |
| CN | 101846799 A | 9/2010 |
| DE | 1422172 | 11/1970 |
| DE | 19725262 | 12/1998 |
| DE | 102013106392 | 12/2014 |
| EP | 0365406 | 4/1990 |

(56) References Cited

FOREIGN PATENT DOCUMENTS

| | | |
|---|---|---|
| EP | 0380035 | 8/1990 |
| EP | 0399865 | 11/1990 |
| EP | 0543718 | 5/1993 |
| EP | 0566004 | 10/1993 |
| EP | 0580952 | 2/1994 |
| EP | 1096293 | 5/2001 |
| EP | 1158336 | 11/2001 |
| EP | 1180711 | 2/2002 |
| EP | 1326102 | 7/2003 |
| EP | 0399865 | 1/2004 |
| EP | 1385023 | 1/2004 |
| EP | 1485747 | 12/2004 |
| EP | 1562066 | 8/2005 |
| EP | 1691547 | 8/2006 |
| EP | 0770818 | 4/2007 |
| EP | 1779159 | 5/2007 |
| FR | 2496905 | 6/1982 |
| FR | 2638242 | 4/1990 |
| FR | 2721872 | 1/1996 |
| GB | 1321303 | 6/1973 |
| GB | 2220081 | 12/1989 |
| GB | 2272980 | 6/1994 |
| GB | 2278222 | 11/1994 |
| GB | 2278888 | 12/1994 |
| IL | 183637 | 6/2013 |
| JP | 08-313843 | 11/1996 |
| JP | 1996313843 | 11/1996 |
| JP | 2002539498 | 11/2002 |
| JP | 2002350771 | 12/2002 |
| JP | 2002368762 | 12/2002 |
| JP | 2003140081 | 5/2003 |
| JP | 2003149643 | 5/2003 |
| JP | 2003520984 | 7/2003 |
| JP | 2003536102 | 12/2003 |
| JP | 2004233909 | 8/2004 |
| JP | 2004527801 | 9/2004 |
| JP | 2005084522 | 3/2005 |
| JP | 2006145644 | 6/2006 |
| JP | 2011221235 | 11/2011 |
| JP | 2012-37761 | 2/2012 |
| JP | 2012-037761 U | 2/2012 |
| JP | 2012163659 | 8/2012 |
| KR | 101470387 | 12/2014 |
| TW | 201809798 | 3/2018 |
| WO | 9314393 | 7/1993 |
| WO | 9510106 | 4/1995 |
| WO | 9815868 | 4/1998 |
| WO | 9952002 | 10/1999 |
| WO | 0004407 | 1/2000 |
| WO | 0055676 | 9/2000 |
| WO | 0063738 | 10/2000 |
| WO | 0127685 | 4/2001 |
| WO | 0195025 | 12/2001 |
| WO | 0195027 | 12/2001 |
| WO | 2082168 | 10/2002 |
| WO | 02082168 | 10/2002 |
| WO | 02088825 | 11/2002 |
| WO | 02097515 | 12/2002 |
| WO | 03058320 | 7/2003 |
| WO | 03081320 | 10/2003 |
| WO | 2004053541 | 6/2004 |
| WO | 2004109349 | 12/2004 |
| WO | 2005024485 | 3/2005 |
| WO | 2005024491 | 3/2005 |
| WO | 2005024969 | 3/2005 |
| WO | 2005093493 | 10/2005 |
| WO | 2005124427 | 12/2005 |
| WO | 2006013565 | 2/2006 |
| WO | 2006061927 | 6/2006 |
| WO | 2006085308 | 8/2006 |
| WO | 2006085309 | 8/2006 |
| WO | 2006085310 | 8/2006 |
| WO | 2006087709 | 8/2006 |
| WO | 2007054928 | 5/2007 |
| WO | 2007093983 | 8/2007 |
| WO | 2008023367 | 2/2008 |
| WO | 2008129539 | 10/2008 |
| WO | 2008149339 | 12/2008 |
| WO | 2009074638 | 6/2009 |
| WO | 2011130720 | 10/2011 |
| WO | 2012008966 | 1/2012 |
| WO | 2013065656 | 5/2013 |
| WO | 2013112705 | 8/2013 |
| WO | 2013175465 | 11/2013 |
| WO | 2013188464 | 12/2013 |
| WO | 2014076599 | 5/2014 |
| WO | 2014155096 | 10/2014 |
| WO | 2015012280 | 1/2015 |
| WO | 2015081313 | 6/2015 |
| WO | 2016103251 | 6/2016 |
| WO | 2016132347 | 8/2016 |
| WO | WO2015012280 | 3/2017 |
| WO | 2017106873 | 6/2017 |
| WO | 2018138714 | 8/2018 |

OTHER PUBLICATIONS

International Commission On Non-Ionizing Radiation Protection "ICNIRP Guidelines for Limiting Exposure To Time-Varying Electric, Magnetic and Electromagnetic Fields (Up To 300 Ghz)" Published In: Health Physics 74 (4):494-522; 1998.

Jan van de Kraats et al. "Directional and nondirectional spectral reflection from the human fovea" journal of biomedical optics 13(2), 024010 (Mar./Apr. 2008.

Mukawa et al. A full-color eyewear display using planar waveguides with reflection volume holograms. Journal of The Society for Information Display—J SOC INF DISP. Mar. 17, 2009. 10.1889/JSID17.3.185-187 Mar. 31, 2009 (Mar. 31, 2009) pp. 285-287.

* cited by examiner

OPTICAL SYSTEM AND METHOD FOR IMPROVEMENT OF LIGHT FIELD UNIFORMITY

TECHNOLOGICAL FIELD

The present invention is generally in the field of optical techniques for improving light field uniformity within a field of view of the optical system. The invention is particularly useful in near-eye displays for displaying virtual images, based on lightguide couplers.

BACKGROUND

The main physical principle of the operation of a lightguide coupler used in near-eye displays (NEDs) is that light waves, indicative of a virtual image, are trapped inside a substrate by total internal reflections from the major surfaces of the substrate, and are coupled out into the eyes of the viewer by one or more (internal) at least partially reflecting or diffracting surfaces. One of the important factors defining the performance of the NED is associated with a requirement for uniformity of illumination formed by light output from the lightguide coupler. The non-uniformities, or irregularities, are intrinsic to the lightguide based NEDs, regardless of the physics of the coupling-out. The irregularities can look like fringes, or bands of lower/higher intensity over the image, with angular frequencies lay roughly in a range between % of the field of view (FOV) and FOV/100. In light-guide architectures that address colors independently, these appear as color variations across the scene.

Various techniques have been developed to improve the uniformity of illumination, and are described for example in U.S. Pat. Nos. 6,829,095, 7,724,442, 8,004,765, 9,551,874, and WO16132347, all assigned to the applicant of the present application.

GENERAL DESCRIPTION

As described above, uniformity of illumination/brightness across the field of view of the system output is an important requirement for the system performance, and especially for a display devices including a virtual imaging system. The above mentioned earlier techniques solved this problem by utilizing coatings on various surfaces along the light propagation path averaging up the brightness of the dark and light areas of the image.

Yet another technique developed by the inventor of the present application is described in a recently filed International Patent Application No. PCT/IL2018/050010. According to this technique, a masking optical element is used which is optically coupled to an output of an optical unit, which produces light of non-uniform intensity profile across the field of view of the optical unit. The masking element is configured with a spatially varying transmission profile across the element in accordance with the non-uniform intensity profile, such that light interaction with (e.g. passage through) the masking element affects regions of relatively high light intensity within the intensity profile to apply intensity modulation to light passing through the masking optical element and improve the light intensity uniformity.

The present invention provides a novel approach for improving intensity/brightness uniformity of an image produced by the system as observed by a viewer. The invention is particularly useful for optical systems of the kind utilizing a light-guiding optical element (LOE) for guiding light propagation therethrough. Such LOE is used in near-eye display devices for projecting a virtual image. The LOE is configured for guiding virtual-image light propagation through the LOE by total internal reflection from major surfaces thereof, and may include one or more light directing surfaces (e.g. at least partially reflective surfaces) embedded therein for directing the virtual-image light towards one or more output directions.

According to the present invention, the illumination uniformity profile of an image as observed by a viewer is improved (i.e., the image at an eye pupil of the viewer) by applying intensity modulation to an image-carrying optical field which is to be input to the optical system, via the entry pupil of the optical system. The input field intensity modulation is applied electronically (e.g. via operation of a spatial light modulator), which may be performed concurrently with the creation of the image data to be input into the optical system or is applied to the previously created image data prior to be input in the optical system.

According to the invention, data about the optical system is provided, i.e. measured, or simulated based on the known configuration of a light propagation channel defined by the optical system. Such data about the optical system includes a characterizing intensity transfer function map $I_1(x,\phi)$ across a lateral dimension x of an exit pupil of the optical system and an angular span $\phi$ of a field of view (FOV) corresponding to an image to be presented to the viewer by the optical system. In other words, the optical system has its characteristic intensity profile in an angular-spatial space. This data is analyzed to properly affect the image data which is to be input in the optical system, such that the image being displayed is viewed by observer with improved intensity uniformity.

Thus, according to one broad aspect of the invention, there is provided a display device for producing images to be viewed by an observer. The display device comprises an optical system, and a control unit. The optical system comprises a light propagation channel having an exit pupil, and is configured and operable to receive input light indicative of an image and produce, at the exit pupil, output light having a field of view (FOV) corresponding to the image to be presented to the observer, while configuration of the light propagation channel defines a characterizing intensity transfer function map $I_1(x,\phi)$ of the optical system across a lateral dimension x of the exit pupil and an angular span $\phi$ of the FOV. The control unit is configured and operable to affect the image data which is to be input in the optical system by applying thereto intensity modulation based on a correction intensity map configured to at least partially compensate intensity non-uniformity in the characterizing intensity transfer function map $I_1(x,\phi)$ of the optical system, such that the light output at the exit pupil of the optical system and indicative of the image, has a modulated intensity map which is observed by the viewer with improved intensity uniformity.

In some embodiments, the control unit includes an intensity map generator module which is configured and operable to analyze the characterizing intensity transfer function map $I_1(x,\phi)$ of the optical system and predetermined eye pupil related data, to determine a corresponding intensity transfer function map indicative of angular intensity transfer from the exit pupil to the eye pupil, and generate the correction intensity map. The correction intensity map is analyzed by an intensity map modulator utility which utilizes the correction intensity map to generate corresponding intensity modulation and apply this intensity modulation to the image data being input to the optical system. The intensity modulation applied to the image is applied as an inversion of data indicative of at least a portion of the correction intensity map.

The predetermined eye pupil related data comprises data indicative of eye pupil dimension x' (either given or measured for a specific observer), and/or data indicative of a distance z between the exit pupil and the eye pupil (which might be fixed for a specific head mounted near-eye display device) or measured during the use of the device, and also data indicative of a lateral offset (x'-x) between the exit pupil and the eye pupil.

In some embodiments, the intensity map generator module comprises an integrator module configured to convolve the characterizing intensity transfer function map $I_1(x,\phi)$ over a predetermined eye pupil dimension x' and a predetermined lateral offset (x'-x) between the exit pupil and the eye pupil to obtain data indicative of convolved intensity transfer function map $I'_1((x'-x), \phi)$ indicative of angular intensity transfer from the exit pupil to the predetermined eye pupil dimension x'.

As indicated above, the control unit may utilize given data indicative of the eye pupil dimension x'.

In some embodiments, the data indicative of the convolved intensity transfer function map $I'_1((x'-x), \phi)$ includes a plurality of convolved intensity transfer function maps corresponding to different pupil extents x'.

The intensity map generator module may include a selector module/utility configured and operable to utilize data indicative of a distance z between the exit pupil and the eye pupil and a lateral offset (x'-x) between the exit and eye pupils, and analyze the convolved intensity transfer function map $I'_1((x'-x), \phi)$ to identify, in the convolved intensity transfer function map $I'_1((x'-x), \phi)$, a region corresponding to the specific distance z and offset (x-x') values, and generate the correction intensity map.

The intensity map modulator utility is configured to generate the intensity modulation as an inversion of the selected region of the convolved intensity transfer function map $I'_1((x'-x), \phi)$.

As indicated above, one or more parameters of the eye pupil related data may be measured during the image display sessions. To this end, the system includes an eye position controller configured and operable to monitor one or more parameters of the eye pupil of the observer, and determine the eye pupil related data, to thereby enable the control unit to dynamically adjust the correction intensity map.

As also indicated above, in some embodiments, the display device according to the invention is configured as a near-eye display device for displaying virtual images, or through-see display device to additionally and concurrently displaying real scene images. The optical system of such near-eye display device may include a light-guiding optical element (LOE) comprising a waveguide configured for guiding light propagation therethrough by total internal reflections from major surfaces of the waveguide and comprising one or more light directing surfaces embedded in the waveguide and arranged to define the exit pupil for directing light out of the waveguide.

In some embodiments, the control unit is configured to communicate with a storage device to receive the data indicative of the characterizing intensity transfer function map of the optical system. Alternatively or additionally, the control unit may include a simulator module configured and operable to receive data indicative of the configuration of the light propagation channel of the optical system and determine simulated data comprising the data indicative of the characterizing intensity transfer function map of the optical system.

According to another broad aspects of the invention, it provides a control system for controlling illumination uniformity of an image observed by a viewer from a display device having an optical system. The control system is configured as a computer system comprising a data processor and analyzer which comprises an intensity map generator module, and an intensity map modulator utility in data communication with the intensity map generator module. The intensity map generator module is configured and operable to receive and analyze input data comprising viewer's eye pupil related data and characterizing intensity transfer function map $I_1(x,\phi)$ of the optical system across a lateral dimension x of an exit pupil of the optical system and an angular span $\phi$ of a field of view (FOV) corresponding to an image to be presented to the viewer by the optical system. The intensity map generator module determines a corresponding intensity transfer function map indicative of angular intensity transfer from the exit pupil to the eye pupil, and generates a correction intensity map. The intensity map modulator utility is configured and operable to utilize the correction intensity map and generate corresponding intensity modulation to be applied to image data being input to the optical system to affect the image data to at least partially compensate intensity non-uniformity in the characterizing intensity transfer function map of the optical system, to provide that output light at the exit pupil of the optical system, which is indicative of the image, has a modulated intensity map observed by the viewer with improved intensity uniformity.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
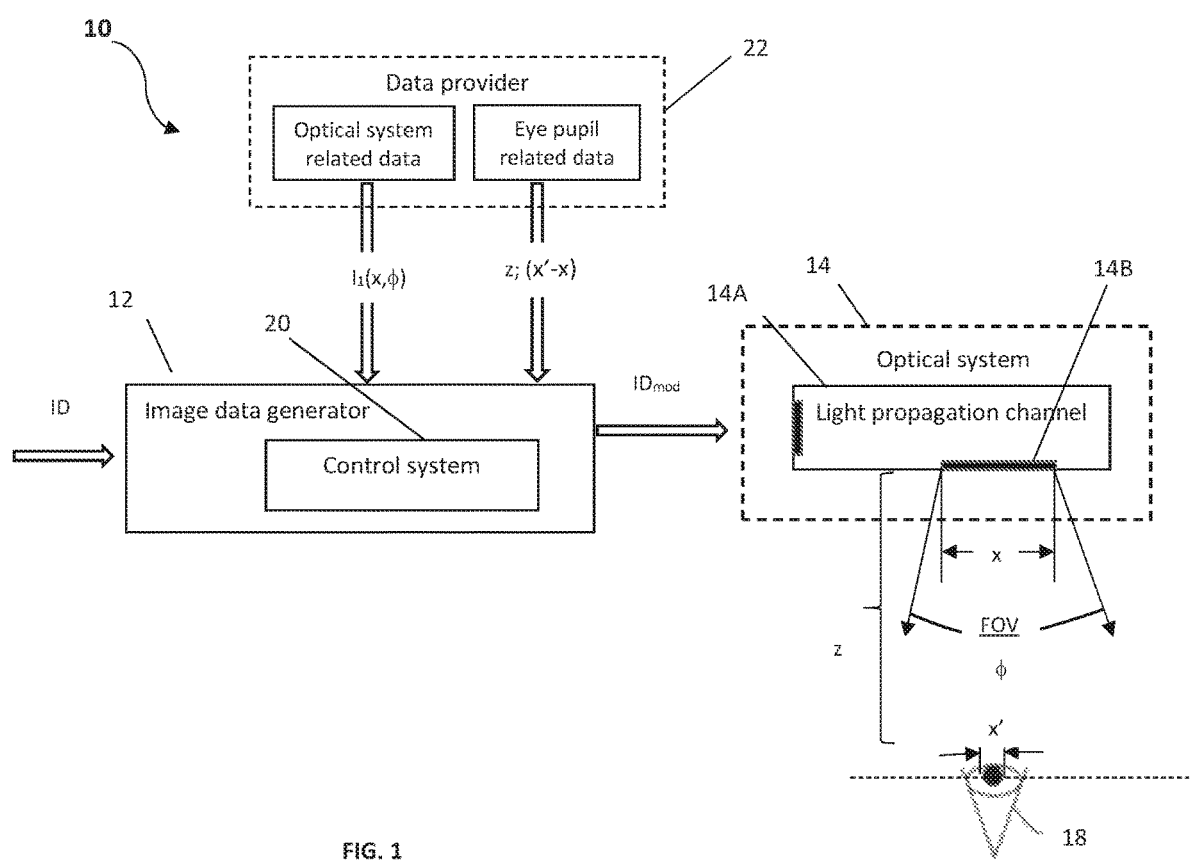
FIG. 1 is a block diagram of a display device, configured according to the invention, for displaying images to be viewed by an observer.

Reference is made to FIG. 1 illustrating, by way of a block diagram a display device 10 of the present invention. The display device 10 includes an optical system 14 associated with an image data generator 12. The latter is configured an operable to receive image data from an image data provider and generate corresponding optical field (structured light with light intensity map). This can be implemented by using a spatial light modulator, e.g. LCD-based modulator, or generally a matrix of light sources (e.g. OLED).

The optical system 14 includes one or more optical elements (now shown) defining a light propagation channel 14A for guiding the structured light, corresponding to the image to be displayed, through the light propagation channel 14A towards an exit pupil 14B with a field of view (FOV) which corresponds to the image of the optical system to be presented to/viewed by the viewer/observer's eye 18. The configuration of the light propagation channel 14A defines a characterizing intensity transfer function map $I_1(x,\phi)$ of the optical system across a lateral dimension x of the exit pupil 14B and an angular span $\phi$ of the FOV.

Further provided in the display device 10 is a control unit 20 configured and operable according to the invention to control illumination/intensity uniformity of the image as observed by the viewer. It should be understood that the present invention is aimed at improving the intensity profile of the image as observed by the viewer, namely at the eye pupil 18. This will be described more specifically further below.

The control unit 20 may be part of the image data generator 12 or a separate unit. The control unit 20 receives image data ID indicative of light intensity map which is to be input to the optical system and affects this image data by applying intensity modulation thereto to generate intensity modulated image data $ID_{mod}$. This intensity modulated image data $ID_{mod}$ is transformed into corresponding optical field (structured light), by any suitable known configuration of spatial light modulator (SLM), e.g. LCD-based modulator, to propagate through the optical system 14.

The intensity modulation applied by the control unit 20 is based on a correction intensity map which is determined by the control unit and is configured to at least partially compensate intensity non-uniformity in the characterizing intensity transfer function map $I_1(x, \phi)$ of the optical system, such that the image-carrying output light at the exit pupil 14B of the optical system 14 has a modulated intensity map $I_{mod}$ which is observed by the viewer with improved intensity uniformity.

As exemplified in the figure, the control unit 20 receives input data (e.g. accesses a storage device where such data is stored), from a data provider 22 (e.g. storage device), including data indicative of the characterizing intensity transfer function map $I_1(x, \phi)$ of the optical system. It should, however, be noted that the data indicative of the characterizing intensity transfer function map $I_1(x, \phi)$ may include such map data itself previously created (e.g. simulated or measured) and stored in the storage device; or such data indicative of characterizing intensity transfer function map $I_1(x, \phi)$ may include data about the configuration of the light propagation channel of the given optical system. In the latter case, the control unit 20 includes a simulator module configured and operable to analyze the configuration of the light propagation channel and determine simulated data characterizing intensity transfer function map $I_1(x,\phi)$ of the optical system. This will also be described further below.

As also shown in the figure, the control unit 20 also could utilize eye pupil related data in order to generate the intensity modulated image data $ID_{mod}$. Such eye pupil related data includes one or more of such parameters as a lateral dimension x' of the eye pupil, a distance z between the exit pupil 14B and the eye pupil 18, and a lateral offset (x'−x) between the exit pupil 14B and the eye pupil 18.

In some embodiments, one or more of these parameters may be given, i.e. of the typical values (e.g. lateral dimension x' of the eye pupil is typically of about 3 mm); values for the distance z and lateral offset (x'−x) between the exit pupil 14B and the eye pupil 18 may be almost fixed in case the position of the display device with respect to the viewer is fixed, such as in case of head mounted display device.

In some other embodiments, as will be described further below, the display device may alternatively or additionally include an eye pupil controller equipped with appropriate eye tracker that monitors/measures changes in the distance z and/or lateral offset (x'−x) values during image displaying sessions, and generates respective data, to which the control unit is responsive to dynamically adjust/update the intensity modulated image data $ID_{mod}$. The eye pupil controller may also include a measurement unit to measure the viewer's eye pupil size x'.

The optical system of the invention or at least a part thereof (e.g. light guiding element) can be of a very compact configuration, and can be used with a head-up display (HUD), being mounted on HUD or being a separate module. Another possible application of the present invention is as a part of a smart phone, which would be installed with a predetermined software application. An examples of such configurations, e.g. a hand-held light guiding element connectable to the HUD, etc. are described in U.S. Pat. No. 8,004,765 assigned to the assignee of the present application.

Figure 2:
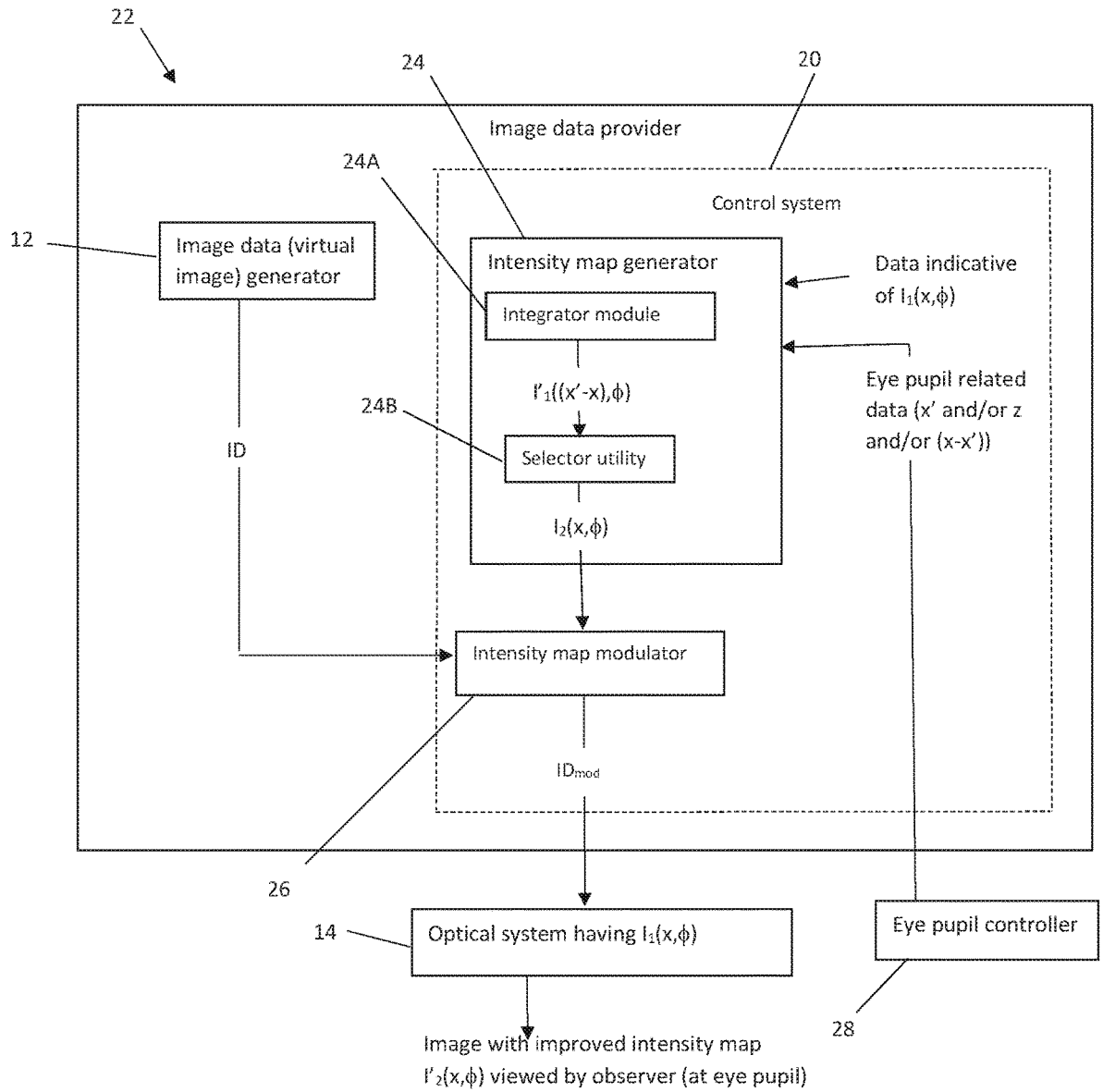
FIG. 2 is a block diagram of the configuration of a control system of the invention for use in the system of FIG. 1 to control illumination uniformity of an image being displayed, as observed by a viewer.

FIG. 2 shows a block diagram of the configuration of an exemplary control unit 20. The control unit 20 includes data input and output utilities and a memory, which are not specifically shown. The control unit 20 may be part of the image data provider 22 or may be a separate unit/circuit 20 configured to be in data communication with the image data generator 12 which is in turn a part of or connectable to the image data provider 22.

The control unit 20 includes an intensity map generator module 24 which is configured and operable to analyze data indicative of the characterizing intensity transfer function map $I_1(x,\phi)$ of the optical system (e.g. given or simulated) and viewer's eye pupil related data, as described above, and determine corresponding intensity transfer function map indicative of angular intensity transfer from the exit pupil to the eye pupil, and generate a correction intensity map $I_2(x,\phi)$.

As exemplified in the figure, the intensity map generator module 24 includes an integrator module 24A which is configured to convolve the characterizing intensity transfer function map $I_1(x,\phi)$ over a predetermined eye pupil dimension x' and a predetermined lateral offset (x'−x) between the exit pupil and the eye pupil and obtain data indicative of convolved intensity transfer function map $I'_1((x'-x),\phi)$. Such convolved intensity transfer function map $I'_1((x'-x),\phi)$ is indicative of angular intensity transfer from the exit pupil 14B to the eye pupil 18 of the predetermined lateral dimension and relative location with respect to the exit pupil.

It should be noted that the case may be such that the data indicative of convolved intensity transfer function map $I'_1((x'-x),\phi)$ is prepared comprising a plurality of convolved intensity transfer function maps corresponding to different pupil extents x'. In this example, the intensity map generator module 24 further includes a selector module 24B which is configured and operable to utilize the data indicative of distance z between the exit pupil 14B and the eye pupil 18 and the lateral offset (x'−x) between the exit and eye pupils, to identify in the convolved intensity transfer function map $I'_1((x'-x),\phi)$ a region corresponding to the distance z and the offset (x-x') values, and generate the correction intensity map $I_2(x,\phi)$.

Also provided in the control unit 20 is an intensity map modulator utility 26 which receives image data ID (e.g. virtual image) from the image data generator 12, and receives the correction intensity map $I_2(x,\phi)$ from the intensity map generator module 24. The intensity map modulator utility 26 is configured and operable to analyze the correction intensity map $I_2(x,\phi)$ and generate corresponding intensity modulation and apply this modulation to the image data ID, to thereby produce the intensity modulated image data $ID_{mod}$. The intensity modulation is produced and applied to the image data ID for example as an inversion (or some approximation of inversion) of the correction intensity map, i.e. inversion of the selected region of the convolved intensity transfer function map $I'_1((x'-x),\phi)$.

The so-created intensity modulated image data $ID_{mod}$ is transformed into the corresponding light field (structured light) which enters the optical system 14 with the characterizing intensity transfer function map $I_1(x,\phi)$, to at least partially compensate intensity non-uniformity in the characterizing intensity transfer function map $I_1(x, \phi)$ of the optical system. As a result, output light at the exit pupil of the optical system, indicative of the original image, has a modulated intensity map, such that a corresponding image with improved intensity map $I'_2(x,\phi)$ is viewed by observer (at eye pupil).

Considering a display device used in virtual imaging systems, the display device typically includes an eye pupil controller (eye tracker) 28 which dynamically adjusts/updates one or more of the eye pupil related parameters (typically, distance z and lateral offset (x-x')). Accordingly, the control unit 20 (its intensity map generator 24) dynamically adjusts the correction intensity map $I_2(x,\phi)$.

Reference is now made to FIGS. 3A to 3E which exemplify the technique of the invention for controlling operation of an LOE-based optical system used in near-eye displays.

Figure 3A:
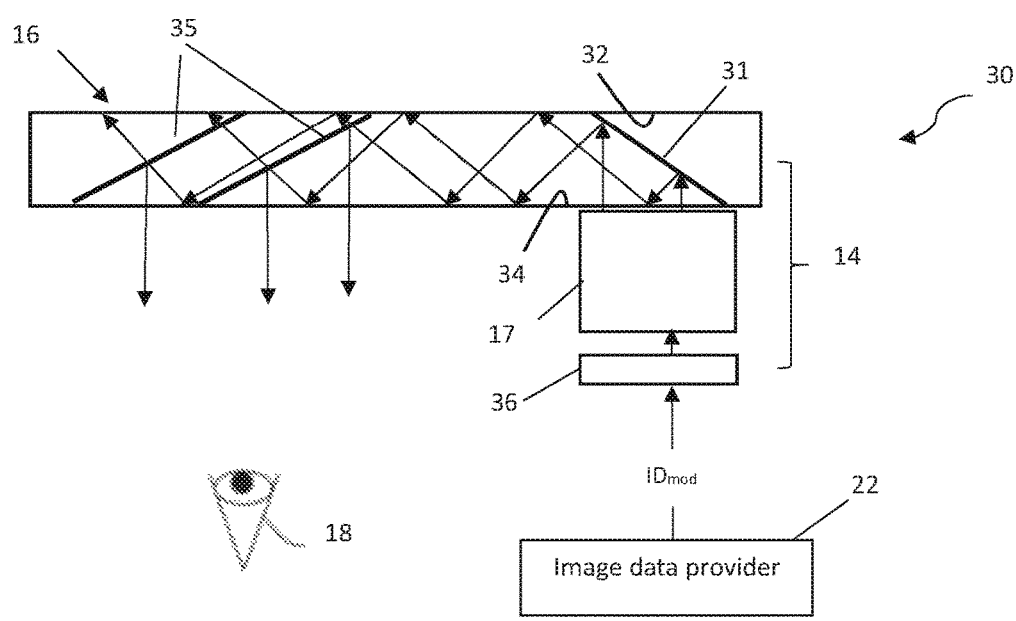
FIGS. 3A to 3D exemplify the technique of the invention for improving illumination uniformity in observing images being displayed by a near-eye display utilizing an LOE-based optical system.

FIG. 3A exemplifies a head up display device 30, which includes the optical system 14 utilizing an LOE 16 having major surfaces 32 and 34 and light directing elements 31 and 35 (at least partially reflective) embedded therein, and a collimating module 17, defining together a light propagation channel 14A through the optical system 14. As also shown in the figure, the display device 30 includes an image creation device 36 configured as described above (e.g. includes projector, e.g. SLM-based) to transform the image data into the corresponding image-carrying light. The image creation device is operated by the image data provider 22 (configured for example as described above) including or connectable to the control unit 20. As shown in the figure, image-carrying light passes through the collimating module 17, enters the LOE (waveguide/substrate) 16, is reflected from light directing element (reflector) 31 and is trapped in the substrate/body of the LOE, where the light is guided by total internal reflection from major surface 32 and 34 and successively interact with at least partially reflective elements 35 which couple the light out of the substrate to propagate towards a pupil 18 of viewer's eye.

The configuration and operation of such LOE-based optical system 14 are known per se and are exemplified in the above-mentioned earlier patent publications of the assignee of the present application. The configuration and operation of such optical system do not form part of the present invention, and therefore are not described here in details. As for the principles of using the configuration of the optical system to determine/simulate the characterizing intensity transfer function map $I_1(x,\phi)$ of the optical system, these are described more specifically further below.

Figure 3B:
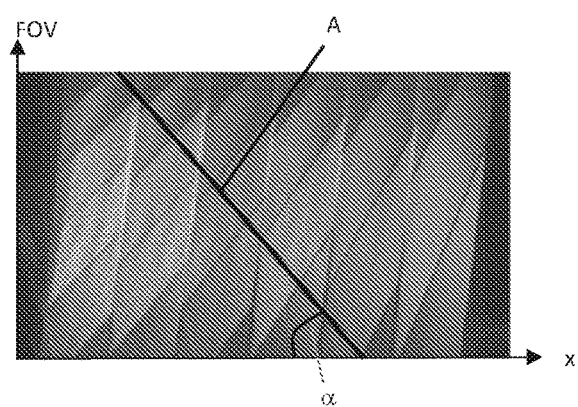

FIG. 3B exemplifies the characterizing intensity transfer function map $I_1(x,\phi)$ of the optical system across a lateral dimension x of the exit pupil and an angular span $\phi$ of the FOV corresponding to the image to be presented to the observer, and also along distance z between the exit pupil and the eye pupil of the observer. Here, line A and its angular orientation a correspond to, respectively, the lateral dimension x' of the eye pupil and eye pupil position z with respect to the exit pupil of the optical system.

Figure 3C:
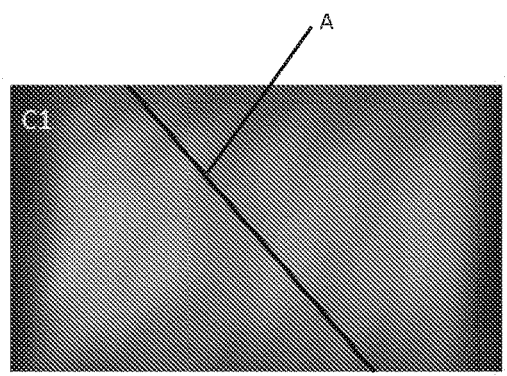

FIG. 3C shows the convolved intensity transfer function map $I'_1((x'-x),\phi)$, which is obtained by convolving the characterizing intensity transfer function map $I_1(x,\phi)$ of FIG. 3B over the predetermined eye pupil dimension x' and the predetermined lateral offset (x'-x) between the exit pupil and the eye pupil. Such convolved intensity transfer function map $I'_1((x'-x),\phi)$ is indicative of angular intensity transfer from the exit pupil to the predetermined eye pupil dimension x'.

Figure 3D:
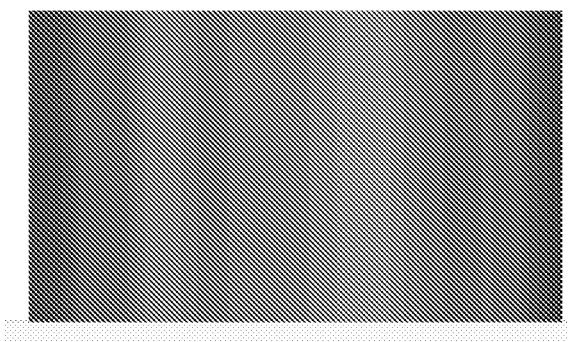

FIG. 3D shows the correction intensity map $I_2(x,\phi)$, which is obtained by utilizing distance z and lateral offset (x'-x) to extract from the convolved intensity transfer function map $I'_1((x'-x),\phi)$, a region corresponding to these distance z and offset (x-x') values.

As described above, the so-obtained correction intensity map $I_2(x,\phi)$ is then used to apply the intensity modulation to image data as an inversion of the correction intensity map $I_2(x,\phi)$ and operate the image creation device 36 (e.g. projector) accordingly.

Reference is made to FIGS. 4A-4C and 5A-5C which exemplify how the light scheme propagation through the exemplified LOE-based optical system affects the intensity map at the exit pupil of the optical system (i.e. of the LOE), which can be used to simulate the characterizing intensity transfer function map $I_1(x,\phi)$ of the optical system across a lateral dimension x of the exit pupil and an angular span 4 of the FOV corresponding to the image to be presented to the observer. These figures illustrate the nature of dark-band effects and their representation in the angular-spatial space, i.e. in the intensity transfer function map $I_1(x,\phi)$ characterizing the specific optical system.

Figures 4A, 4B, 4C:
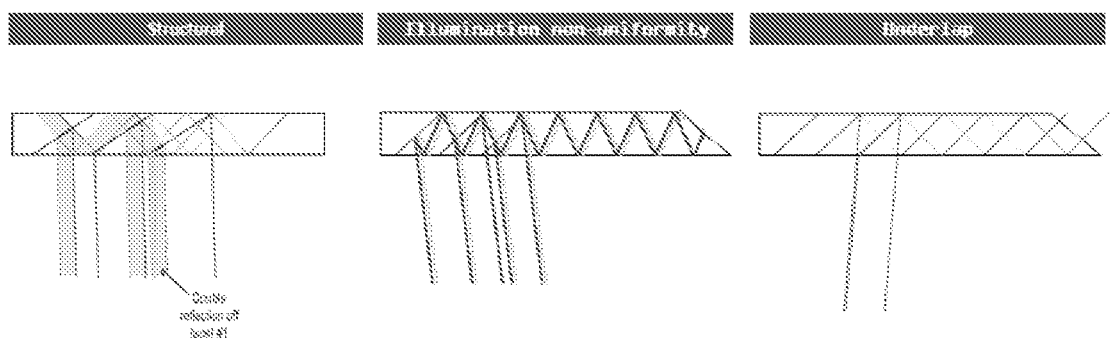
FIGS. 4A-4C and 5A-5C exemplify how the light scheme propagation through an exemplified LOE-based optical system affects the intensity map at the exit pupil of the LOE, which can be used to simulate the intensity map of the LOE-based optical system.
Figure 5A:
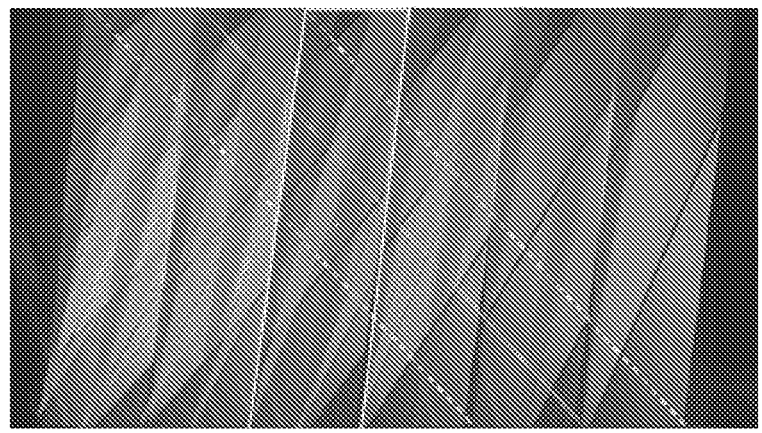

FIG. 4A shows the so-called "structural bands" associated effect: due to the difference in light interaction with light directing elements 30 for rays of entering the LOE with different angles, over the FOV, some rays undergo more attenuation than others. More specifically, structural bands are multiplied by each total internal reflection, as a result at a higher number of light directing element/facet (in the order of successively arranged facets in a general direction of light propagation through the LOE), e.g. at $3^{rd}$ facet, they add up resulting in a visually prominent band. This is shown in FIG. 5A.

Figure 5B:
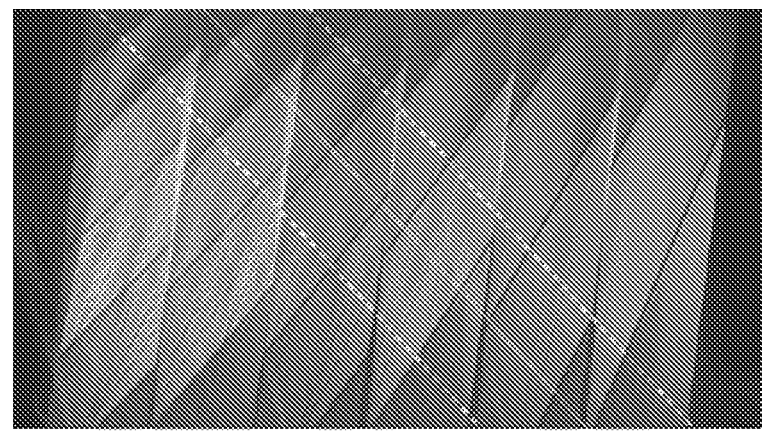

FIGS. 4B and 5B show the "illumination non-uniformity" related band: uneven illumination over the entrance pupil is replicated by the LOE and form periodic variations of brightness.

Figure 5C:
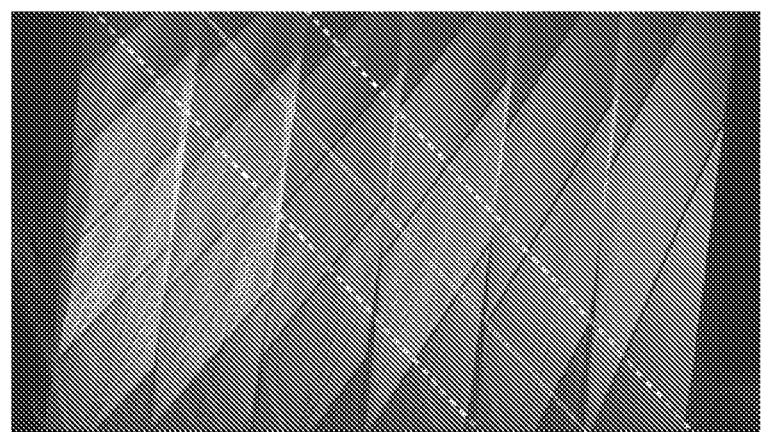

FIGS. 4C and 5C show a so-called "underlap bands effect": at lower angles there are thin areas that rays cannot fill, while at higher angles there are similar areas rays fill twice.

Thus, the characterizing intensity transfer function map $I_1(x,\phi)$ of the optical system can be used to determine the complete data about dark bands over the field of view, for any pupil lateral dimension and z distances. Using this data, the correction map can be determined, and the dark bands effects can be compensated electronically (with accuracy depending on eye position knowledge).

The technique of the invention can be used in addition to the above-described coating-based solution. For example, the inventor has found that for the LOE-based optical system, the most problematic dark bands effects appear at the center of pupil dimension/FOV map, and this can be improved/by proper coating design, while the other effects can be compensated/improved electronically by the correction map as described above.

Figure 6:
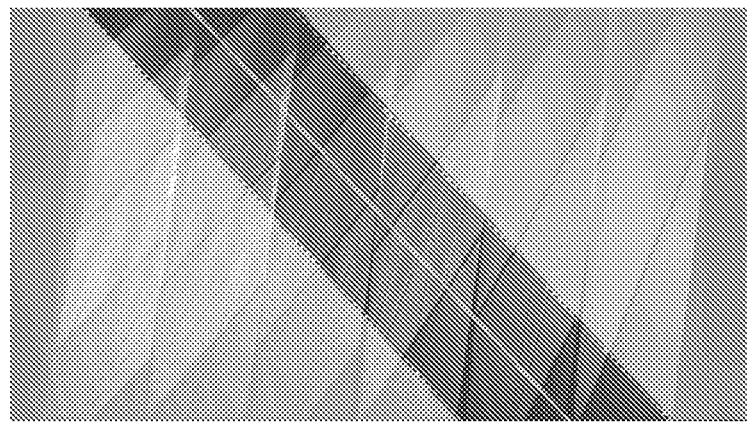
FIG. 6 exemplifies how a characterizing intensity transfer function map $I_1(x,\phi)$ of the optical system in the angular-spatial space can be measured using a line CCD scan.

As also indicated above, the characterizing intensity transfer function map $I_1(x,\phi)$ of a given optical system may be measured. Such measurements can be implemented, for example, by scanning the exit pupil output using a line CCD. This is exemplified in FIG. 6, which shows the line CCD map, i.e. measured intensity profile in the angular-spatial space (across a lateral dimension x of the exit pupil, along distance z from the exit pupil, and an angular span $\phi$ of the FOV). The line profile is the intensity variation over the FOV across the pupil x, and the slope a corresponds to the eye relief or distance z.

Such map, either measured or simulated, contains all the intensity data for the eye relief (z distance), eye position (lateral offset) and the eye pupil diameter (lateral dimension). Therefore, this map, being the characterizing intensity transfer function map $I_1(x,\phi)$ of the optical system in the angular-spatial space, can be used to compensate (dynamically via eye tracker or statically) for the intensity non-uniformity sources (dark bands effects).

The invention claimed is:

1. A display device for producing images to be viewed by an observer, the display device comprising:
 an optical system comprising a light propagation channel having an exit pupil, the optical system being configured and operable to receive input image-carrying light indicative of an image to be displayed and producing at said exit pupil output light having a field of view (FOV) corresponding to said image to be presented to the observer, a configuration of the light propagation channel defining a characterizing intensity transfer function map $I_1(x,\varphi)$ of the optical system across a lateral dimension x of the exit pupil and an angular span $\varphi$ of said FOV; and
 a control unit configured and operable to affect the image data by applying thereto intensity modulation based on a correction intensity map configured to at least partially compensate intensity non-uniformity in the characterizing intensity transfer function map $I_1(x,\varphi)$ of the optical system, such that said input image-carrying light corresponds to intensity modulated image data $ID_{mod}$ indicative of the image to be displayed and the output light at the exit pupil of the optical system, indicative of said image, has a modulated intensity map observed by the viewer with improved intensity uniformity, wherein the control unit comprises:
  an intensity map generator module configured and operable to analyze the characterizing intensity transfer function map $I1(x,\varphi)$ of the optical system and predetermined eye pupil related data, determine a corresponding intensity transfer function map indicative of angular intensity transfer from the exit pupil to the eye pupil, and generate the correction intensity map, and
  an intensity map modulator utility configured and operable to utilize said correction intensity map to generate corresponding intensity modulation and apply said intensity modulation to the image data being input to the optical system, and
 wherein said intensity map generator module comprises an integrator module configured to convolve the characterizing intensity transfer function map $I_1(x,\varphi)$ over a predetermined eye pupil dimension x' and a predetermined lateral offset (x'-x) between the exit pupil and the eye pupil to obtain data indicative of convolved intensity transfer function map $I'_1((x'-x),\varphi)$ indicative of angular intensity transfer from the exit pupil to said predetermined eye pupil dimension x'.

2. The display device according to claim 1, wherein said predetermined eye pupil related data comprises data indicative of eye pupil dimension x'.

3. The display device according to claim 1, wherein said predetermined eye pupil related data comprises data indicative of a distance z between the exit pupil and the eye pupil and a lateral offset x'-x between the exit pupil and the eye pupil.

4. The display device according to claim 1, wherein the control unit utilizes given data indicative of the eye pupil dimension x'.

5. The display device according to claim 1, wherein said data indicative of convolved intensity transfer function map $I'_1((x'-x),\varphi)$ comprises a plurality of convolved intensity transfer function maps corresponding to different pupil extents x'.

6. The display device according to claim 1, wherein said intensity map generator module comprises a selector module configured and operable to utilize data indicative of a distance z between the exit pupil and the eye pupil and a lateral offset (x'-x) between the exit and eye pupils, and analyze said data indicative of the convolved intensity transfer function map $I'_1((x'-x),\varphi)$ to identify in said convolved intensity transfer function map $I'_1((x'-x),\varphi)$ a region corresponding to the distance z and the offset (x-x'), and generating said correction intensity map.

7. The display device according to claim 1, comprising an eye position controller configured and operable to monitor one or more parameters of an eye pupil of the observer during image displaying sessions, determining the eye pupil related data, to thereby enable the control unit to dynamically adjust the correction intensity map.

8. The display device according to claim 1, wherein the optical system comprises a light-guiding optical element (LOE) comprising a waveguide configured for guiding light propagation therethrough by total internal reflections from major surfaces of the waveguide and comprising one or more light directing surfaces embedded in the waveguide and arranged to define the exit pupil for directing light out of the waveguide.

9. The display device according to claim 1, wherein said control unit is configured to communicate with a storage device to receive said data indicative of the characterizing intensity transfer function map $I_1(x,\varphi)$ of the optical system.

10. The display device according to claim 1, wherein said control unit comprises a simulator module configured and operable to receive data indicative of the configuration of the light propagation channel of the optical system and determine simulated data comprising said data indicative of the characterizing intensity transfer function map $I_1(x,\varphi)$ of the optical system.

11. A control system for controlling illumination uniformity of an image observed by a viewer from a display device having an optical system, the control system comprising data input and output utilities, a memory utility, and a data processor and analyzer comprising:

an intensity map generator module configured and operable to receive and analyze input data comprising viewer's eye pupil related data and characterizing intensity transfer function map $I_1(x,\varphi)$ of the optical system across a lateral dimension x of an exit pupil of the optical system and an angular span $\varphi$ of a field of view (FOV) corresponding to an image to be presented to the viewer by said optical system, determine corresponding intensity transfer function map indicative of angular intensity transfer from the exit pupil to the eye pupil, and generate a correction intensity map; and an intensity map modulator utility configured and operable to utilize said correction intensity map and generate corresponding intensity modulation to be applied to image data being transformed into image-carrying light indicative of the image to be input to the optical system, said intensity modulation affecting the image data to at least partially compensate intensity non-uniformity in the characterizing intensity transfer function map $I_1(x,\varphi)$ of the optical system, to provide that output light at the exit pupil of the optical system, indicative of said image, has a modulated intensity map observed by the viewer with improved intensity uniformity, wherein said intensity map generator module comprises an integrator module configured to convolve the characterizing intensity transfer function map $I'_1((x'-x),\varphi)$ over a predetermined eye pupil dimension x' and a predetermined lateral offset (x'-x) between the exit pupil and the eye pupil to obtain data indicative of convolved intensity transfer function map $I'_1((x'-x),\varphi)$ indicative of angular intensity transfer from the exit pupil to said predetermined eye pupil dimension x'.

12. The control system according to claim 11, wherein said predetermined eye pupil related data comprises data indicative of eye pupil dimension x'.

13. The control system according to claim 11, wherein said predetermined eye pupil related data comprises data indicative of a distance z between the exit pupil and the eye pupil and a lateral offset x'-x between the exit pupil and the eye pupil.

14. The control system according to claim 11, wherein said intensity map generator module data receives input data comprising the eye pupil dimension x'.

15. The control system according to claim 11, wherein said data indicative of convolved intensity transfer function map $I'_1((x'-x),\varphi)$ comprises a plurality of convolved intensity transfer function maps corresponding to different pupil extents x'.

16. The control system according to claim 11, wherein said intensity map generator module comprises a selector module configured and operable to utilize data indicative of a distance z between the exit pupil and the eye pupil and a lateral offset (x'-x) between the exit and eye pupils, and analyze said data indicative of the convolved intensity transfer function map $I'_1((x'-x),\varphi)$ to identify in said convolved intensity transfer function map $I'_1((x'-x),\varphi)$ a region corresponding to the distance z and the offset (x-x'), and generating said correction intensity map.

17. The control system according to claim 11, configured to be responsive to input data comprising one or more parameters of an eye pupil of the viewer during image displaying sessions, determining the eye pupil related data, and dynamically adjusting the correction intensity map.

* * * * *